United States Patent
Ducheneaut et al.

(10) Patent No.: US 8,265,252 B2
(45) Date of Patent: Sep. 11, 2012

(54) SYSTEM AND METHOD FOR FACILITATING COGNITIVE PROCESSING OF SIMULTANEOUS REMOTE VOICE CONVERSATIONS

(75) Inventors: Nicolas B. Ducheneaut, Sunnyvale, CA (US); Trevor F. Smith, Seattle, WA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 1188 days.

(21) Appl. No.: 12/101,764

(22) Filed: Apr. 11, 2008

(65) Prior Publication Data
US 2009/0259464 A1 Oct. 15, 2009

(51) Int. Cl.
*H04M 3/42* (2006.01)
(52) U.S. Cl. .................................. 379/202.01
(58) Field of Classification Search ............. 379/202.01; 370/260
See application file for complete search history.

(56) References Cited

U.S. PATENT DOCUMENTS

| | | | |
|---|---|---|---|
| 5,026,051 A | 6/1991 | Lowe et al. | |
| 5,337,363 A | 8/1994 | Platt | |
| 5,556,107 A | 9/1996 | Carter | |
| 5,736,982 A | 4/1998 | Suzuki et al. | |
| 5,754,660 A | 5/1998 | Shimizu | |
| 5,768,393 A | 6/1998 | Mukojima et al. | |
| 5,784,467 A | 7/1998 | Asayama | |
| 5,862,229 A | 1/1999 | Shimizu | |
| 5,926,400 A | 7/1999 | Kytle et al. | |
| 6,183,367 B1 | 2/2001 | Kaji et al. | |
| 6,219,045 B1 | 4/2001 | Leahy et al. | |
| 6,241,612 B1 | 6/2001 | Heredia | |
| 6,323,857 B1 | 11/2001 | Mielekamp et al. | |
| 6,352,476 B2 | 3/2002 | Miyamoto et al. | |
| 6,454,652 B2 | 9/2002 | Miyamoto et al. | |
| 6,519,629 B2 | 2/2003 | Harvey et al. | |
| 6,532,007 B1 | 3/2003 | Matsuda | |
| 6,612,931 B2 | 9/2003 | Kojima et al. | |
| 6,633,617 B1 | 10/2003 | Cooklev | |
| 6,772,195 B1 | 8/2004 | Hatlelid et al. | |
| 6,837,793 B2 | 1/2005 | McClintic | |
| 6,981,223 B2 | 12/2005 | Becker et al. | |
| 7,115,035 B2 | 10/2006 | Tanaka | |
| 7,124,372 B2 | 10/2006 | Brin | |
| 7,480,696 B2 | 1/2009 | Kirkland et al. | |
| 7,491,123 B2 | 2/2009 | Smith | |
| 7,512,656 B2 | 3/2009 | Tsuchiya | |
| 7,549,924 B2 | 6/2009 | Canessa et al. | |
| 7,590,249 B2 | 9/2009 | Jang et al. | |
| 7,699,704 B2 | 4/2010 | Suzuki et al. | |
| 7,828,657 B2 | 11/2010 | Booth | |
| 2001/0029204 A1 | 10/2001 | Mizuno et al. | |
| 2002/0165025 A1 | 11/2002 | Kawahara | |

(Continued)

*Primary Examiner* — Alexander Jamal
(74) *Attorney, Agent, or Firm* — Patrick J. S. Inouye

(57) ABSTRACT

A system and method for facilitating cognitive processing of simultaneous remote voice conversations is provided. A plurality of remote voice conversations participated in by distributed participants are provided over a shared communication channel. A main conversation between at least two of the distributed participants and one or more subconversations between at least two other of the distributed participants are identified from within the remote voice conversations. Segments of interest to one of the distributed participants are defined including a conversation excerpt having a lower attention activation threshold for the one distributed participant. Each of the subconversations is parsed into conversation excerpts. The conversation excerpts are compared to the segments of interest. One or more gaps between conversation flow in the main conversation are predicted. Segments of interest are selectively injected into the gaps of the main conversation as provided to the one distributed participant over the shared communications channel.

24 Claims, 9 Drawing Sheets

U.S. PATENT DOCUMENTS

| | | |
|---|---|---|
| 2006/0075055 A1 | 4/2006 | Littlefield |
| 2006/0148551 A1 | 7/2006 | Walker et al. |
| 2007/0156886 A1 | 7/2007 | Srivastava |
| 2010/0217822 A1* | 8/2010 | Katis et al. .................. 709/206 |

* cited by examiner

SYSTEM AND METHOD FOR FACILITATING COGNITIVE PROCESSING OF SIMULTANEOUS REMOTE VOICE CONVERSATIONS

FIELD

This invention relates in general to computer-mediated group communication. In particular, this invention relates to a system and method for facilitating cognitive processing of simultaneous remote voice conversations.

BACKGROUND

Conversation analysis characterizes the order and structure of human spoken communication. Conversation can be formal, such as used in a courtroom, or more casual, as in a chat between old friends. One fundamental component of all interpersonal conversation, though, is turn-taking, whereby participants talk one at-a-time. Brief and short gaps in conversation often occur. Longer gaps, however, may indicate a pause in the conversation, a hesitation among the speakers, or a change in topic. As a result, conversation analysis involves consideration of both audible and temporal aspects.

Conversation is also dynamic. When groups of people gather, a main conversation might branch into subconversations between a subset of the participants. For example, coworkers discussing the weather may branch into a talk about one co-worker's weekend, while another part of the group debates the latest blockbuster movie. An individual involved in one discussion would find simultaneously following the other conversation difficult. Cognitive limits on human attention force him to focus his attention on only one conversation.

Passive listening is complicated by the dynamics of active conversation, such as where an individual is responsible for simultaneously monitoring multiple conversations. For example, a teacher may be listening to multiple groups of students discuss their class projects. Although the teacher must track each group's progress, simultaneously listening to and comprehending more than one conversation in detail is difficult, again due to cognitive limits on attention.

Notwithstanding, the human selective attention process enables a person to overhear or focus on certain words, even when many other conversations are occurring simultaneously. For example, an individual tends to overhear her name mentioned in another conversation, even if she is attentive to some other activity. Thus, the teacher would recognize her name being spoken by one student group even if she was listening to another group. These "high meaning" words have a lower attention activation threshold since they have more "meaning" to the listener. Each person's high meaning words are finite and context-dependent, and a large amount of subconversation may still be ignored or overlooked due to the limits, and inherent unreliability, of the selective attention process.

As well, cognition problems that occur when attempting to follow multiple simultaneous conversations are compounded when the participants are physically removed from one another. For instance, teleconferencing and shared-channel communications systems allow groups of participants to communicate remotely. Conversations between participants are mixed together on the same media channel and generally received by each group over a single set of speakers, which hampers following more than one conversation at a time. Moreover, visual cues may not be available and speaker identification becomes difficult.

Current techniques for managing simultaneous conversations place audio streams into separate media channels, mute or lower the volume of conversations in which a participant is not actively engaged, and use spatialization techniques to change the apparent positions of conversants. These techniques, however, primarily emphasize a main conversation to the exclusion of other conversations and noises.

Therefore, an approach is needed to facilitate monitoring multiple simultaneous remote conversations. Preferably, such an approach would mimic and enhance the human selective attention process and allow participants to notice those remote communications of likely importance to them, which occur in subconversations ongoing at the same time as a main conversation.

SUMMARY

A system and method provide insertion of segments of interest selectively extracted from voice conversations between remotely located participants into a main conversation of one of the participants. The voice conversations are first analyzed and conversation floors between the participants are identified. A main conversation for a particular participant, as well as remaining subconversations, is identified. A main conversation can be a conversation in which the particular participant is actively involved or one to which the particular participant is passively listening. The subconversations are preferably muted and analyzed for segments of likely interest to the particular participant. The segments of interest are "high meaning" excerpts of the subconversations that are of likely interest to the participant. Gaps or pauses in the natural conversation flow of the main conversation are predicted and the segments of interest are inserted into those predicted gaps of sufficient duration. Optionally, the participant can explore a specific segment of interest further by joining the subconversation from which the segment was taken or by listening to the subconversation at a later time.

One embodiment provides a system and method for facilitating cognitive processing of simultaneous remote voice conversations. A plurality of remote voice conversations participated in by distributed participants are provided over a shared communications channel. Each of a main conversation between at least two of the distributed participants and one or more subconversations between at least two other of the distributed participants are identified from within the remote voice conversations. Segments of interest to one of the distributed participants are defined including a conversation excerpt having a lower attention activation threshold for the one distributed participant. Each of the subconversations is parsed into live conversation excerpts. The live conversation excerpts are compared to the segments of interest. The main conversation is continually monitored and one or more gaps between conversation flow in the main conversation are predicted. The live conversation excerpts are selectively injected into the gaps of the main conversation as provided to the one distributed participant over the shared communications channel.

A further embodiment provides a system and method for providing conversation excerpts to a participant from simultaneous remote voice conversations. A plurality of remote voice conversations actively participated in by distributed participants are provided over a shared communications channel. Each of a main conversation in which one of the distributed participant is actively involved and one or more subcombinations between at least two other of the distributed participants are identified from within the remote voice conversations. Segments of interest to one of the distributed participants are defined including a conversation excerpt having a lower attention activation threshold for the one distributed participant. The subconversations as provided to the one distributed participant over the shared communications channel are muted. Each of the subconversations is parsed into live conversation excerpts. The live conversation excerpts are compared to the segments of interest. The main conversation is continually monitored and one or more gaps between conversation flow in the main conversation are predicted. The live conversation excerpts are selectively injected into the gaps of the main conversation as provided to the one distributed participant over the shared communications channel.

Still other embodiments will become readily apparent to those skilled in the art from the following detailed description, wherein are described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Voice Conversation Environment

Figure 1:
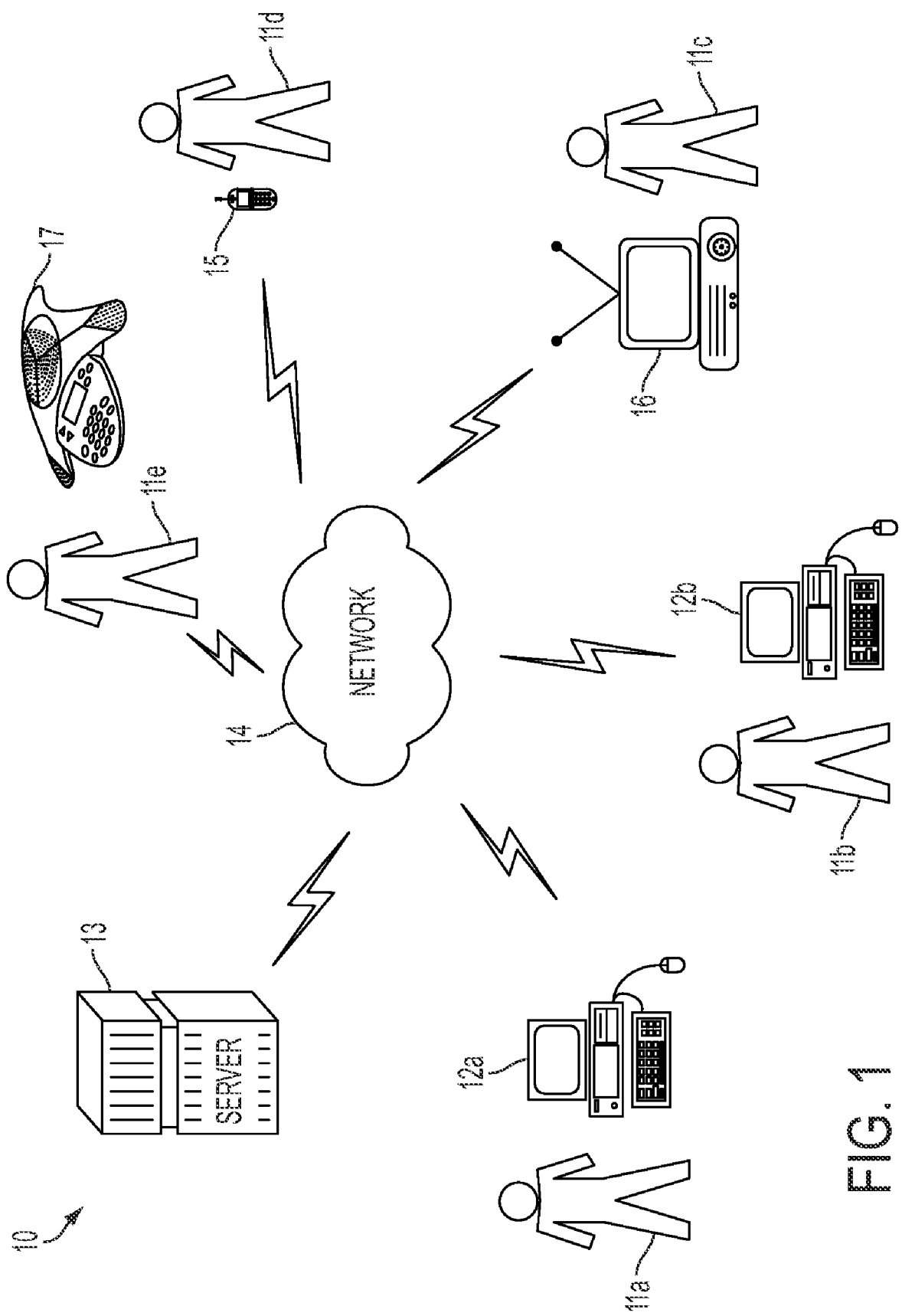
FIG. 1 is a functional block diagram showing, by way of example, a remote voice conversation environment.

In-person conversations involve participants who are physically located near one another, while computer-mediated conversations involve distributed participants who converse virtually from remote and physically-scattered locations. FIG. 1 is a functional block diagram showing, by way of example, a remote voice conversation environment 10. Each participant uses a computer 12a-b for audio communications through, for instance, a microphone and speaker. The computers 12a-b are remotely interfaced to a server 13 over a public data communications network 14, such as the Internet, which enable users to participate in a distributed conversation. Additionally, the computers 12a-b can be interfaced via a telephone landline, wireless network, or cellular network. Other forms of remote interfacing and network configurations are possible.

Preferably, each computer 12a-b is a general-purpose computing workstation, such as a personal desktop or notebook computer, for executing software programs. The computer 12a-b includes components conventionally found in computing devices, such as a central processing unit, memory, input/output ports, network interface, and storage. Other systems and components capable of providing audio communication, for example, through a microphone and speaker are possible, for example, cell phones 15, wireless devices. Web-enabled television set-top boxes 16, and telephone or network conference call systems 17. User input devices, for example, a keyboard and mouse, may also be interfaced to each computer. Other input devices are possible.

The computers 12a-b connect to the server 13, which enables the participants 11a-b to remotely participate in a collective conversation over a shared communication channel. The server 13 is a server-grade computing platform configured as a uni-, multi- or distributed processing system, which includes those components conventionally found in computing devices, as discussed above.

Conversation Modes

Figure 2:
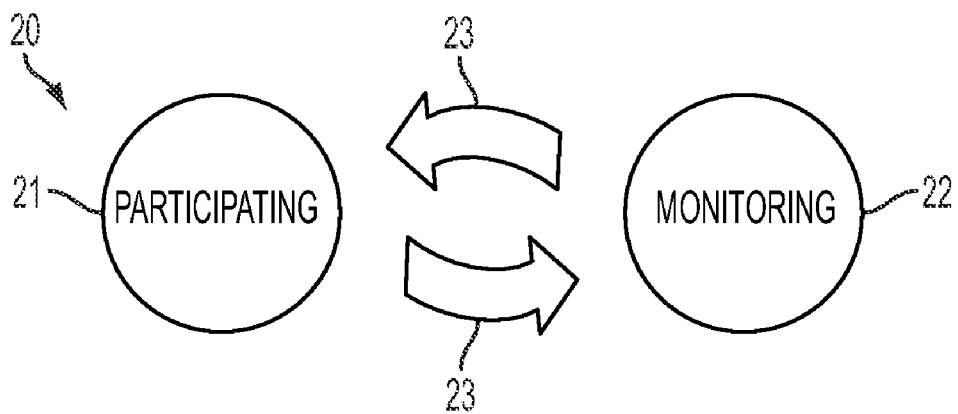
FIG. 2 is a block diagram showing, by way of example, an overview of participating and monitoring conversation modes.

A participant 11a-e can be actively involved in a conversation or passively listening, that is, monitoring. FIG. 2 is a block diagram showing, by way of example, an overview of participating 21 and monitoring 22 conversation modes. In the participating mode 21, a participant 11a actively talks and listens in a main conversation that includes other participants 11b-e. In the monitoring mode 22, the participant 11a is not actively participating in any conversation and is passively listening to a main conversation between other participants 11b-e or to subconversations. Conversation originates elsewhere. Participants 11a-e can transition 23 between the participating mode 21 and the monitoring mode 22 at any time. Each mode will now be considered in depth.

Participating Mode

Figure 3:
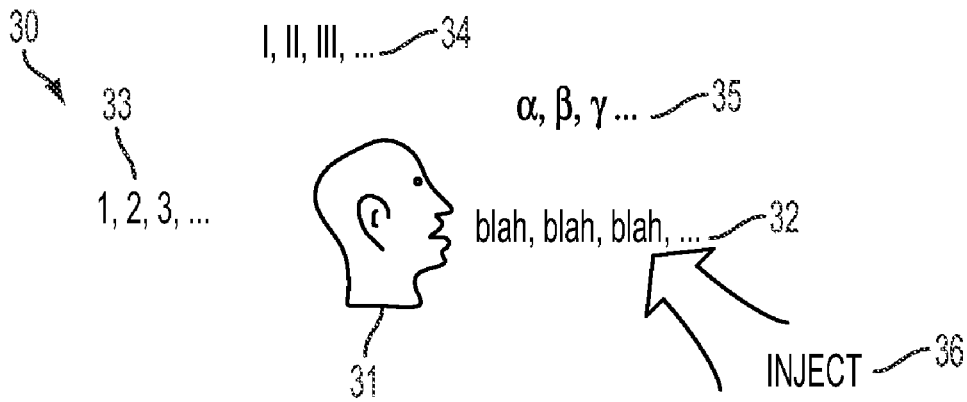
FIG. 3 is a block diagram showing, by way of example, the participating mode of FIG. 2.

In participating mode, a participant 11a is an active part of the main conversation. FIG. 3 is a block diagram showing, by way of example, the participating mode 21 of FIG. 2. Although the participant 31 is involved in a main conversation 32, various subconversations 32-35 can still occur in the background. From a global perspective, the main conversation 32 is merely a subconversation originating with that participant 31. The subconversations 33-35 in which the participant 11a is not actively involved can be concurrently evaluated and high meanings words can be injected 36 into gaps predicted to occur within the main conversation 32, as further described below beginning with FIG. 6.

Monitoring Mode

Figure 4:
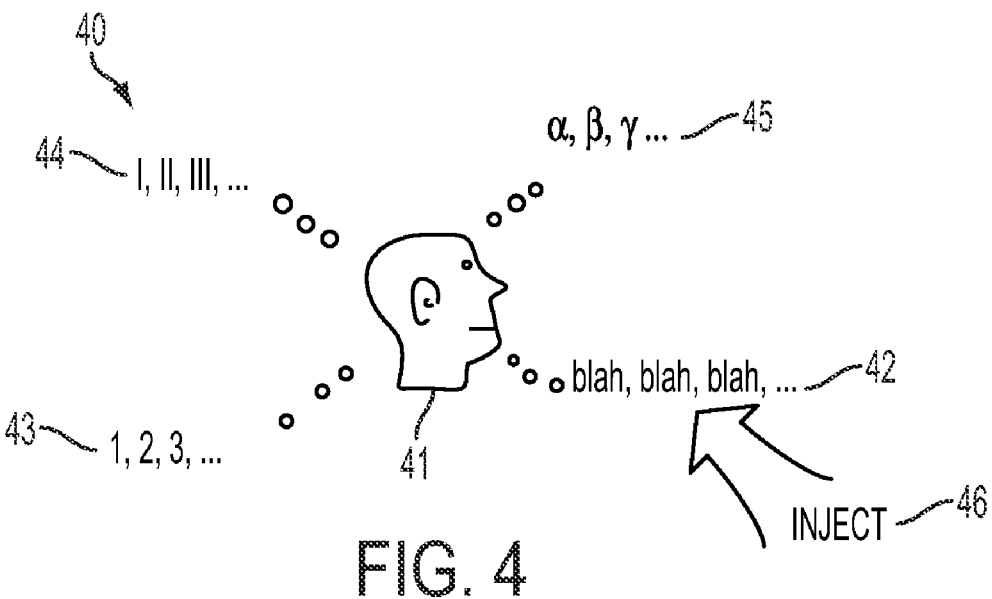
FIG. 4 is a block diagram showing, by way of example, the monitoring mode of FIG. 2.

In monitoring mode, a participant 11a is a listener or third party to the main conversation and subconversations. FIG. 4 is a block diagram showing, by way of example, monitoring mode 22 of FIG. 2. In the monitoring mode 22, the participant 41 is focused on one subconversation, a main conversation 42, of many subconversations 42-25 in the conversation stream. The participant 41 is not actively participating in, but rather is focused on, the main conversation 42. Thus, the main conversation 42 is a subconversation originating elsewhere. The subconversations 43-45 that are not the main conversation 42 are analyzed for high meaning words and the identified portions are injected 46 into predicted gaps of the main conversation 42, as further described below with reference to FIG. 6.

Conversation Architecture

Figure 5:
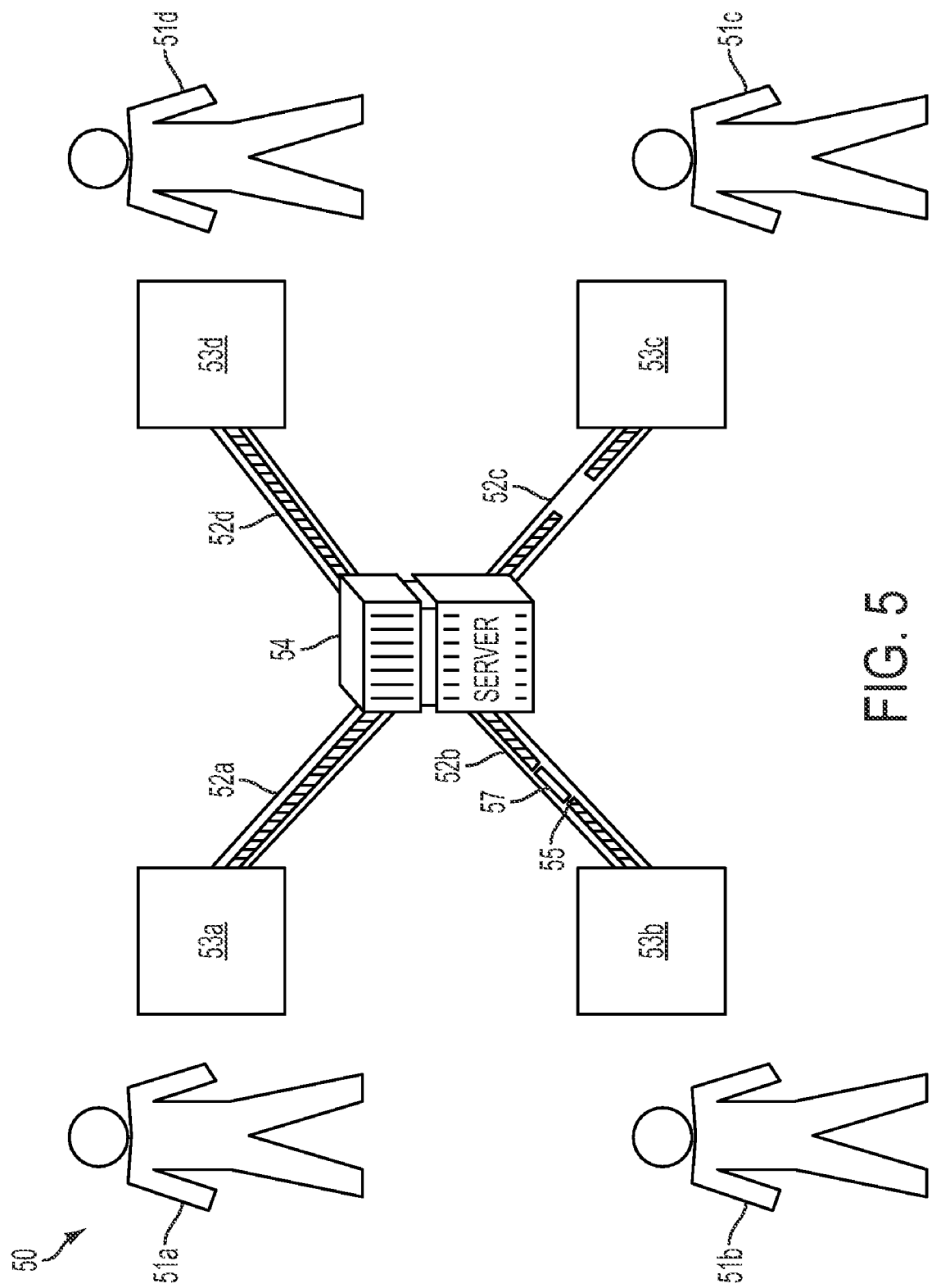
FIG. 5 is a block diagram showing, by way of example, a conversation architecture in accordance with one embodiment.

Distributed participants remotely converse with one another via communication devices that relay the conversation stream. FIG. 5 is a block diagram showing, by way of example, a conversation architecture 50 in accordance with one embodiment. Participants 51*a-d* initiate a group conversation via conversation channels 52*a-d*. Each participant 51*a-d* accesses his or her respective conversation channel 52*a-d* through a communications device 53*a-d*, such as described above with reference to FIG. 1. Conversation streams are received from the participant 51*a-d* by the device 53*a-d*. The conversation streams are delivered through the conversation channels 52*a-d* to the device 53*a-d* and are provided to the participant 51*a-d* as conversations.

A server 54 is communicatively interposed between the devices 53*a-d* and the conversation stream being delivered through the conversation channels 52*a-d* flows through the server 54. In operation, the server 53 receives conversation streams via the communications devices 53*a-d* and, upon receiving the conversation streams, the server 53 assesses the conversation floors and identifies a main conversation in which the participants 51*a-d* are involved. In a further embodiment, the main conversation is a conversation substream originating with a specific participant, who, is actively involved in the main conversation, as described above with reference to FIG. 3. In a still further embodiment, the main conversation is a conversation substream that a specific participant is focused on, but that originated between other participants, as described above with reference to FIG. 4. The participant is monitoring, but is not actively involved in, the main conversation. The server 53 predicts gaps 55 and gap lengths 56 in conversation flow of the main conversation. The remaining, or parallel, conversations that are not identified as the main conversation, that is, the subconversations, are parsed as they occur by the server 53 for conversation excerpts that match segments 57 that may be of interest to a participant 51*a-d*. The server 53 can then inject, the segments 57 into an identified gap 55 in the conversation flow of the main conversation. In a further embodiment, the segment 37 may be stored on a suitable recording medium (not shown), such as a database, and injected into a gap 55 in the conversation flow of the main conversation at a future time point, in a still further embodiment, the functions performed by the server 33 are distributed to one or more of the individual devices 33*a-d*.

Method

Figure 6:
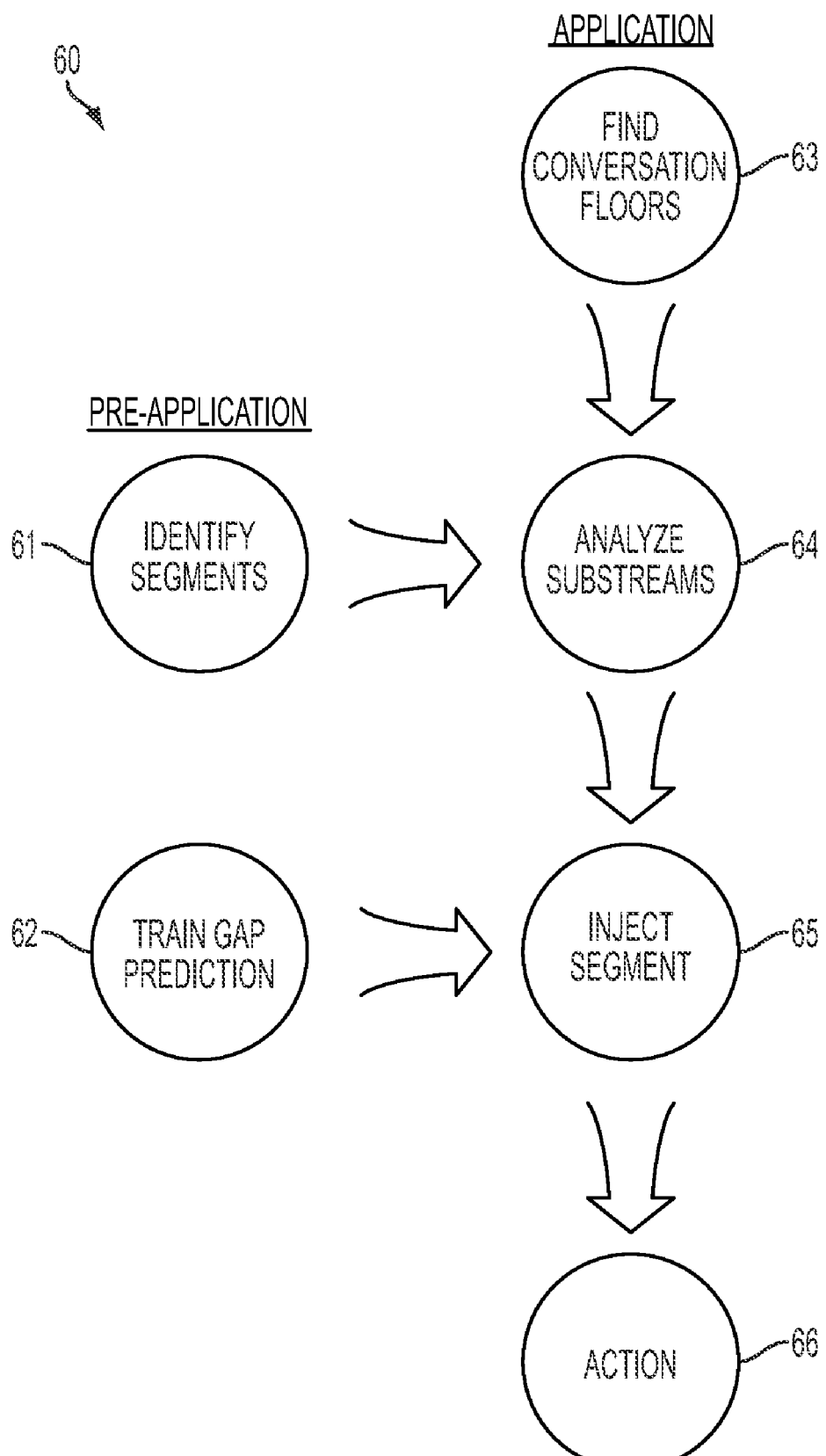
FIG. 6 is a flow diagram showing a method for facilitating cognitive processing of simultaneous remote voice conversations.

Each participant 11*a-e*, through the server 54, can monitor multiple simultaneous streams within a remote conversation. Substreams are processed to mimic the human selective attention capability. FIG. 6 is a block diagram showing a method 20 for facilitating cognitive processing of simultaneous remote voice conversations. The method 20 is performed as a series of process steps by the server 54, or any computing device connected, to the network with access to the conversation stream, as discussed above with reference to FIG. 5.

Certain steps are performed prior to the running of the application. Conversation segments are identified (step 61). The segments can include "high meaning" words and phrases that have a lower activation threshold, as discussed, further with reference to FIG. 7. Gaps and length of the gaps in the conversation flow of the main, conversation are predicted (step 62). The gaps and gap lengths can be predicted based on training data, as further discussed below with reference to FIG. 8.

As a participant 11*a-e* receives a conversation containing multiple audio subconversations, conversation floors are identified (step 63). After identifying the available conversation floors, the conversation floor of a particular participant 11*a-e*, or main conversation, is identified (step 63). The conversation floors and main conversation can be identified directly by the action of the participant 11*a-e* or indirectly, such as described in commonly-assigned U.S. Pat. No. 7,698, 141, issued Apr. 13, 2010, the disclosure of which is incorporated by reference, as further discussed below with reference to FIG. 9. The main conversation can be a conversation that the participant 11*a-e* is actively involved in or one that the participant 11*a-e* is focused on, but not actively participating in. The determination can be automated or participant-controlled. The monitoring mode functions when the participant 11*a-e* is not actively engaged in a conversation but is passively listening in on, or monitoring, a conversation containing multiple audio subconversations. The monitoring mode can be engaged by the participant 11*a-e* or automated. Other modes of main conversation are possible.

All parallel conversations are muted. Parallel conversations are the conversations that remain after the main conversation is identified, that is, the subconversations. Although muted, the server 54 analyzes the parallel conversations (step 64) for segments of interest by parsing the parallel conversations into conversational excerpts and comparing the conversational excerpts to segments, previously identified in step 61, that may be of interest to the participant 11*a-e*, as further described below with reference to FIG. 7. The parsed parallel conversations can be live communication or the result of speech recognition. Segments of interest can include words or parts of words, sentence fragments, and whole sentences. Other grammatical segments are possible. Further, non-grammatical segments are possible, such as sounds. The analysis can be carried out by common information retrieval techniques, for example term frequency-inverse document frequency (TF-IDF). Other information retrieval and analysis techniques are possible.

The parallel conversations are analyzed as they occur. Once a suitable gap, as predicted in step 62, in the conversation flow of the main conversation occurs, the segment, if of possible participant interest, can be injected into the gap provided the predicted gap is of sufficient duration (step 65). In a still further embodiment, the segments are stored on a suitable form of recording medium and injected into a gap at a later time point. In a further embodiment, a participant can choose to perform an action on the injected segment (step 66), as further discussed below with reference to FIG. 11. Processing continues with each successive message.

For example, a group of co-workers are talking in a shared audio space, such as an online conference, about an upcoming project. Two of the participants, Alan and Bob, begin talking about marketing considerations, while Chris and David discuss a problem related to a different project. The conversation floors of Alan and Bob's subconversation, Chris and David's subconversation, as well as the continuing main conversation of the other participants are each identified. Alan and Bob's conversation, from their perspective, is identified as the main conversation for Alan and Bob and all remaining conversations are muted as parallel conversations, which are analyzed for segments of possible interest. Chris says to David that the marketing budget for the other project should be slashed in half. Since Alan is the marketing manager of the other project, the segments "marketing budget" and "slashed" are injected into a predicted gap in Alan and Bob's subconversation. Alan can then choose to join Chris and David's subconversation, as further described below with reference to FIG. 11.

Monitoring mode allows a participant 11a-e to focus on a main conversation, although not actively engaged in the conversation. For example, a 911 emergency services dispatch supervisor is monitoring a number of dispatchers coordinating police activities, including a car chase, an attempted burglary, and a complaint about a noisy neighbor. The conversation floors of the car chase subconversation, the attempted burglary subconversation, and the noise complaint subconversation are each identified. The supervisor, judging that the car chase requires the most immediate attention, places the car chase subconversation as the main conversation. All remaining conversations are muted and analyzed for possible segments of interest. During a gap in the main conversation, the segments "gun" and "shots fired" are injected from the noise complaint subconversation. The supervisor can shift his attention to the noise complaint conversation as the main conversation, as further described below with reference to FIG. 11.

Selection Criteria

Figure 7:
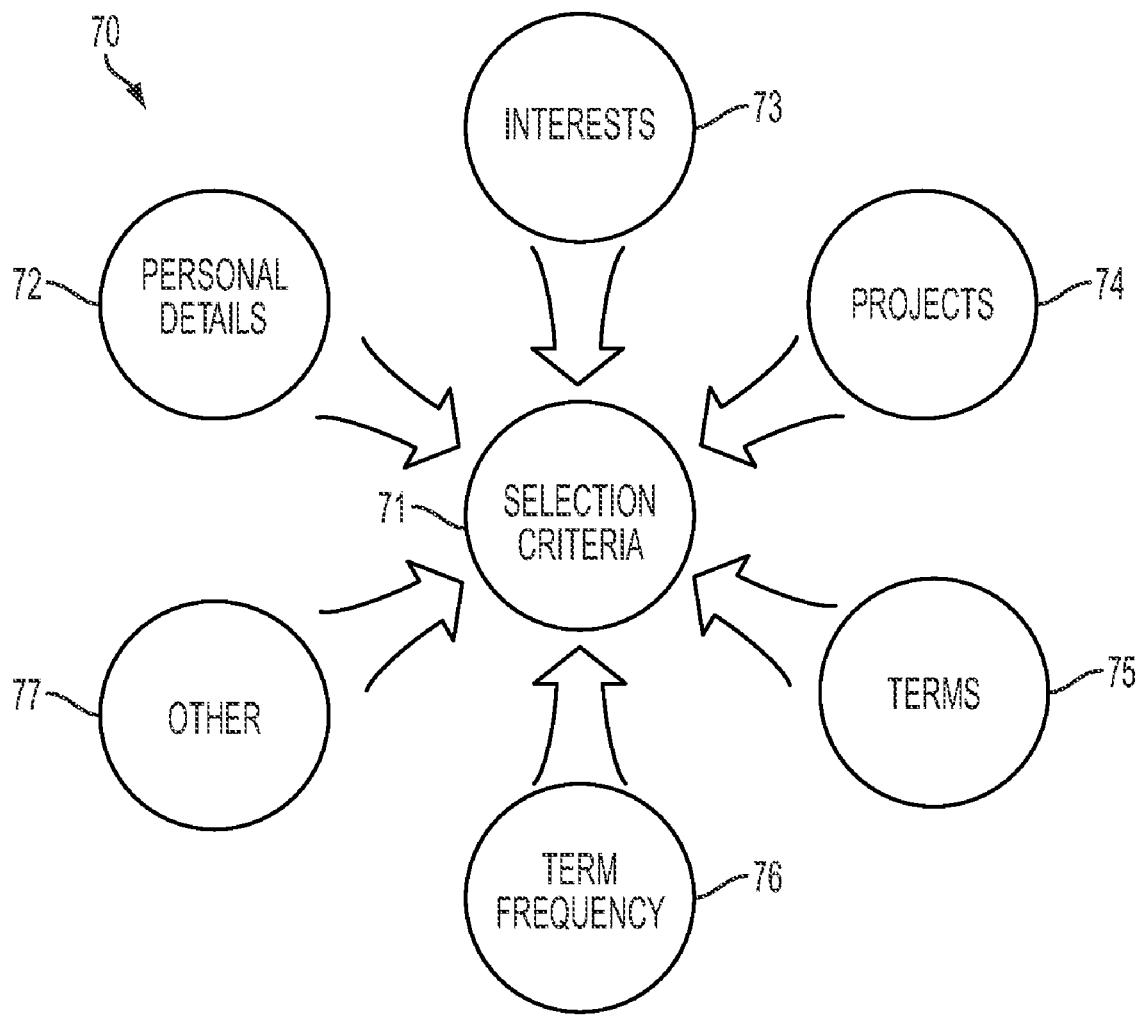
FIG. 7 is a data flow diagram showing, by way of example, categories of selection criteria for segments of interest for use with the method of FIG. 6.

High meaning segments of interest are identified and injected into a main conversation of a participant 11a-e. FIG. 7 is a data flow diagram showing, by way of example, categories 70 of selection criteria 71 for identifying segments of interest for use with the method of FIG. 6. The selection criteria 71 include personal details 72, interests 73, projects 74, terms 75, and term frequency 76. Personal details 72 include personal information of the participant, for example the participant's name, age, and location. Interests 73 include the goals and hobbies of the participant. Projects 74 include the tasks the participant is involved in. Terms 75 include words, phrases, or sounds that have high meaning for the participant. Term frequency 76 identifies important words and sentence segments based on information retrieval techniques, for example, term frequency-inverse document frequency (TF-IDF). Other 77 selection criteria 71 are possible.

Conversation Gap Training

Figure 8:
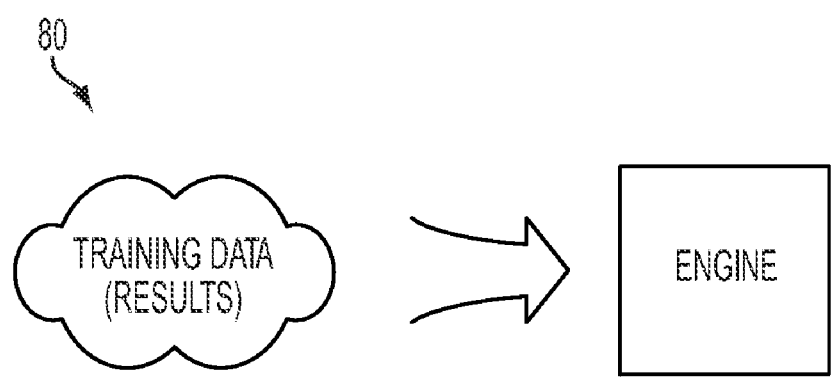
FIG. 8 is a block diagram showing, by way of example, conversation gap training for use with the method of FIG. 6.

FIG. 8 is a block diagram showing, by way of example, conversation gap training 80 for use with the method of FIG. 6. Gap training 80 is used to predict gaps and gap lengths in the conversation flow of the main conversation of a participant 11a-e. The gaps and gap lengths in conversation can be predicted using standard machine learning techniques, such as Bayesian networks, applied to both the structural and content features of the conversation. For example, training data from previous conversations can be used to infer that for a given participant 11a-e, utterances of more than five seconds, a structural feature, are usually followed by a gap due to the fact that the participant 11a-e tends to take short breaths between five second long sentence fragments. Alternatively, the same training data could be used to infer that particular words, a content feature, such as "isn't that right?," are usually followed by a pause. Other conversation features are possible.

The conversation features can be combined, into an algorithm, such as the Bayesian network mentioned above, to produce a probability estimate that a gap of a certain length in conversation will occur. When the probability is high enough, the system will inject content into the predicted gap. In a further embodiment, the threshold for the probability can be user-defined.

Conversation Floor Identification

Figure 9:
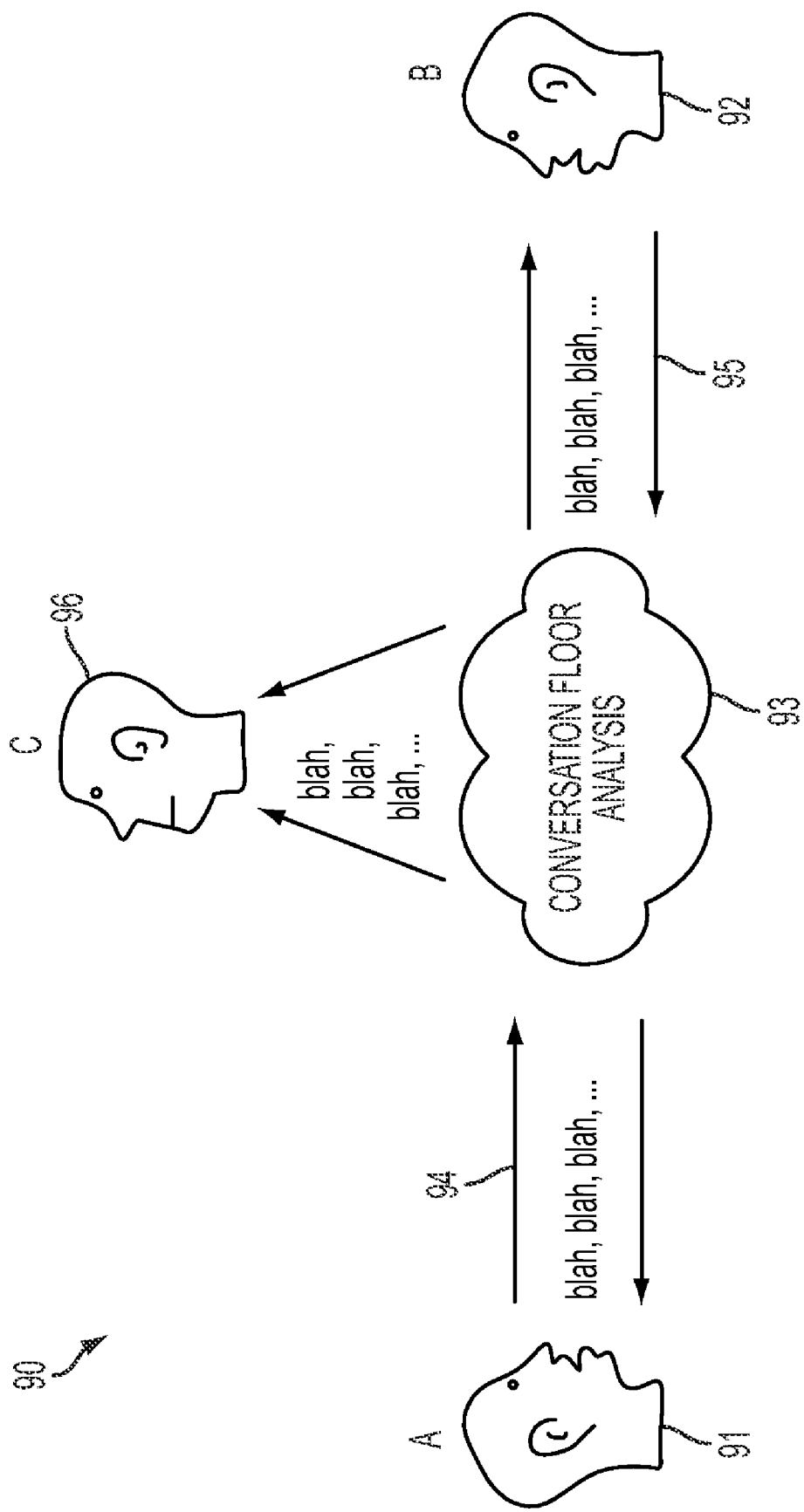
FIG. 9 is a block diagram showing, by way of example, identification of conversation floors for use with the method of FIG. 6.

Conversation floors are identified using conversation characteristics shared between participants engaged in conversation. FIG. 9 is a block diagram showing, by way of example, identification of conversation floors 90 for use with the method of FIG. 6. Conversation floors can be identified directly by a participant or indirectly. Direct identification can be based on an action directly taken by a participant 91, for example placing participants 11a-e in conversation floors. Indirect identification can be by automatic detection of conversational behavior, such as described in commonly-assigned U.S. Pat. No. 7,698,141, issued Apr. 13, 2010, the disclosure of which is incorporated by reference. Participants in conversation with one another share conversation characteristics that can be leveraged to identify the conversation floor that the participants occupy. For example, participants in the same conversation take turns speaking. The conversation floor between the participants can be determined by analyzing the speech start point of one participant and the speech endpoint of another participant. The time difference between the start and endpoints is compared to produce an estimated probability that the participants are in the same conversation floor. In a further embodiment, conversational characteristics can include physiological characteristics of participants, for example as measured by a biometric device. Other ways to determine conversation floors are possible.

Referring now to FIG. 9, the conversation between participants A 91 and B 92 has been identified as a conversation floor through conversation floor analysis 93, as described above, by comparing the speech start point 94 of participant A 91 and the speech endpoint 95 of participant B 92. As participant A 91 is actively involved in the identified conversation floor, the conversation floor is further identified as the main conversation of participant A 91. The system has identified the conversation floor between participants A 91 and B 92 from the perspective of participant C 96 as well. Participant C 96 is not actively involved in the conversation floor but is focused on the conversation floor of participants A 91 and B 92. The system identifies the conversation floor between participants A 91 and B 92 as the main conversation of participant C 96. In a further embodiment, the determination of conversation floor and main conversation can be participant selected.

Segment Types

Figure 10:
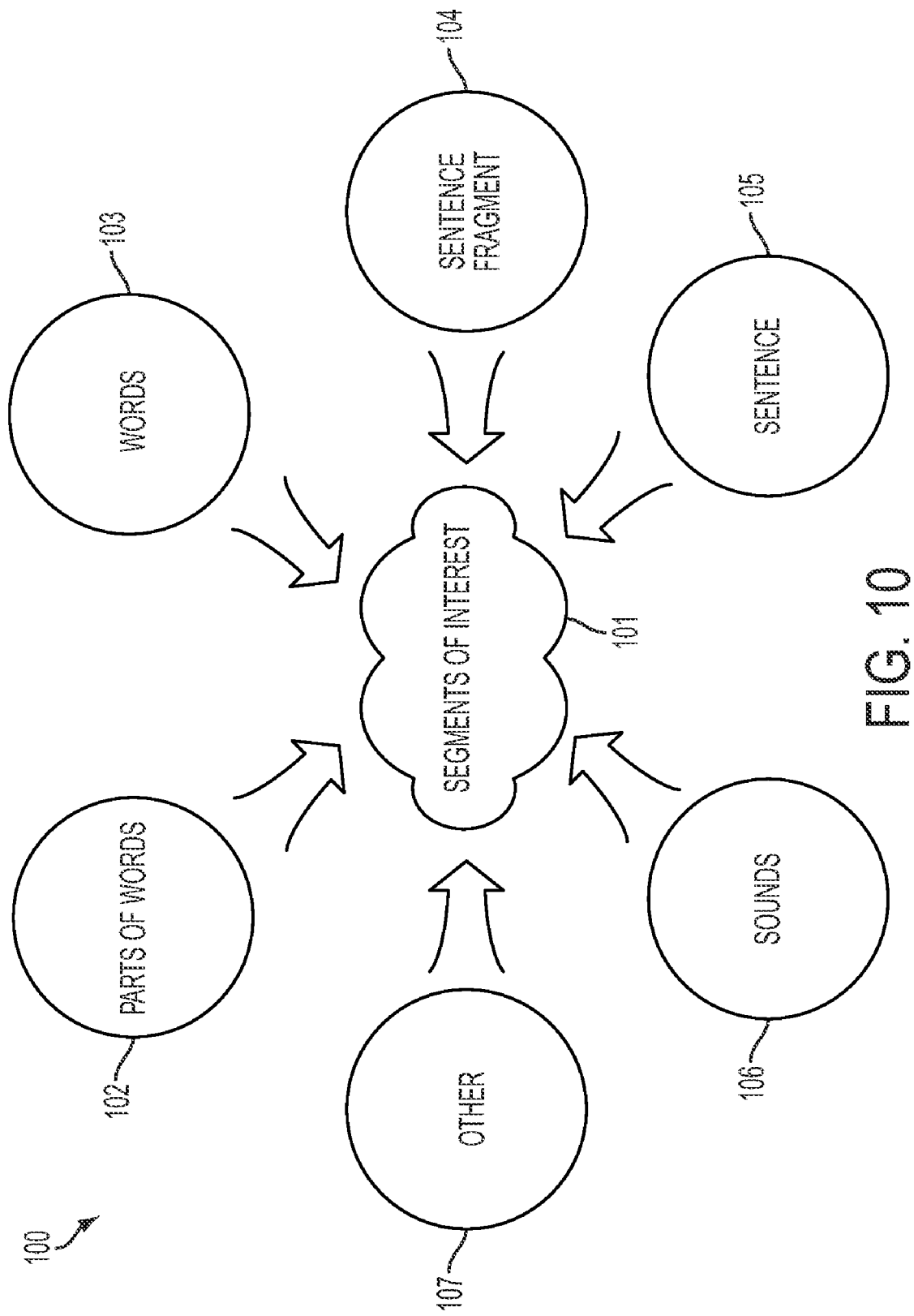
FIG. 10 is a data flow diagram showing, by way of example, injected segments of interest for use with the method of FIG. 6.

The segment of interest is "injected" by including select portions, or excerpts, of the parsed parallel conversations into gaps in conversation flow within a main conversation. FIG. 10 is a data flow diagram showing, by way of example, types 100 of injected segments of interest 101 for use with the method of FIG. 6. The injected segments can include parts of words 102, words 103, sentence fragments 104, sentences 105, and sounds 106. Other types 107 of segments 101 are possible. The type 100 of segment 101 injected, can be participant 11a-e selected or automated. Shorter segments 101 allow for a greater amount of information to be injected per gap in the main conversation, while longer segments 101 can provide greater context.

For example, with reference to the main conversation between Alan and Bob discussed above, parts of words 102, words 103, sentence fragments 104, or entire sentences 105 can be injected, from Chris and David's parallel conversation. Chris's statement to David that the marketing budget for the other project should be slashed in half provides an example. Part of words 102 "marketing" and "slashed" are injected into a predicted gap as "market" and "slash." Alternatively, whole words 103 "marketing" and "slashed" could be injected. Additionally, the sentence fragments 104 "marketing budget for the other project," and "slashed in half" can be injected into the gap in the main conversation. Similarly, Chris's entire sentence 105 "the marketing budget for the other project should be slashed in half" could be injected.

Further, sounds 106 can be injected into gaps of the main conversation. With reference to the 911 dispatch supervisor example discussed above, the sound of a gun discharging from the noise complaint subconversation can be injected into a gap. The supervisor can then choose to shift his attention to that, subconversation, as further described below with reference to FIG. 11.

Segment Selection

Figure 11:
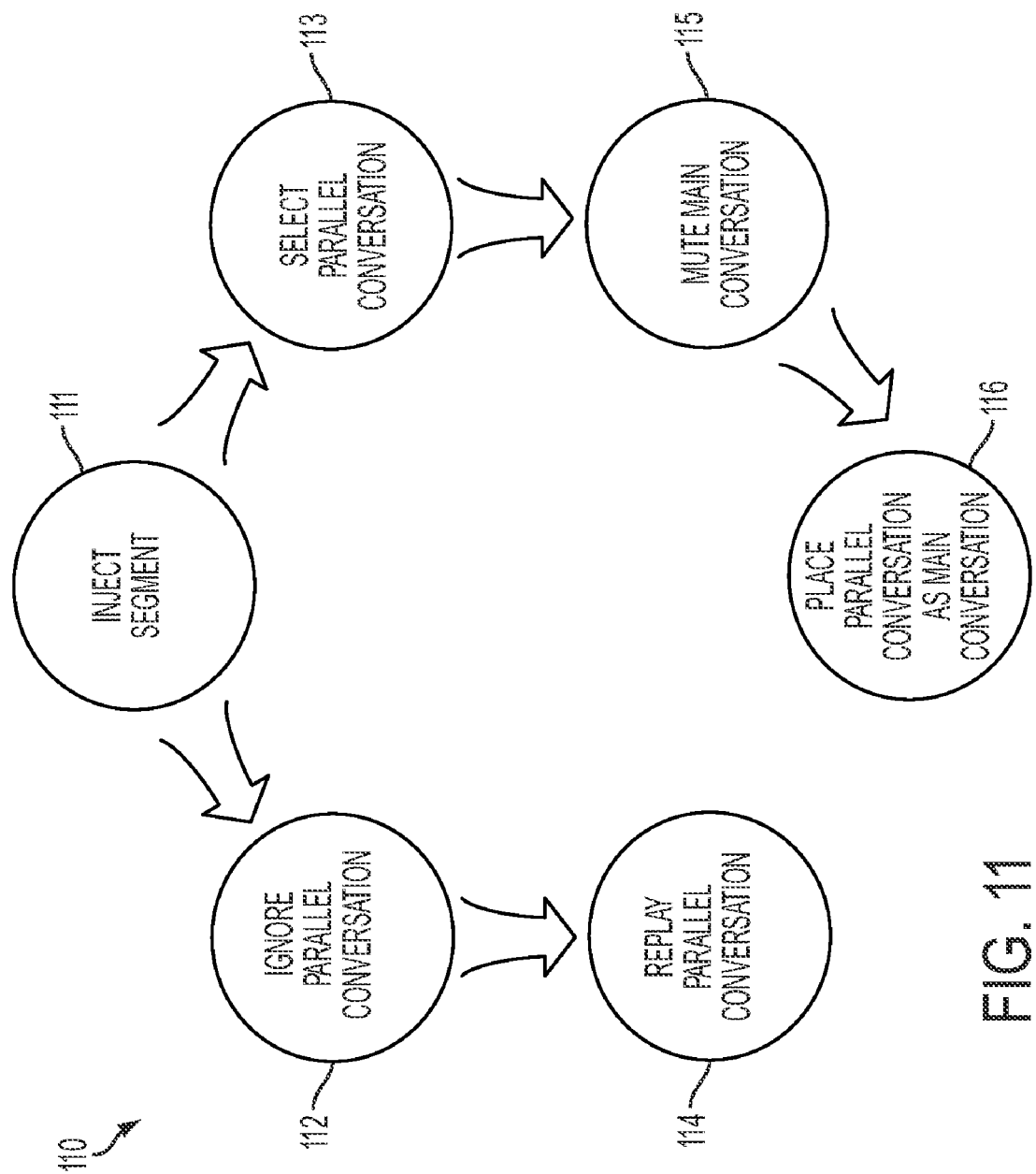
FIG. 11 is a process flow diagram showing, by way of example, sentence segment selection for use with the method of FIG. 6.

After segments of interest have been injected, a participant can choose to ignore the information or investigate the information further. FIG. 11 is a process flow diagram showing, by way of example, segment selection 110 for use with the method of FIG. 6. Segments of interest are injected 111 into gaps in the main conversation. The participant 11a-e can choose to ignore the injected segment 112 and, thus, the parallel conversation from which the segment was extracted, or, can join 113 into the parallel conversation. In a further embodiment, the ignored 112 parallel conversations can be recorded and replayed 114 after the main conversation is completed. During replay 114, the previously ignored 112 parallel conversation, becomes the main conversation.

If the participant 11a-e joins 113 a parallel conversation, the main conversation is muted 115 and placed with other parallel conversations, while the selected 113 parallel conversation becomes 116 the main conversation. Segments of interest from the parallel conversations can then be injected into gaps of the new main conversation.

Segment Playback

Figure 12:
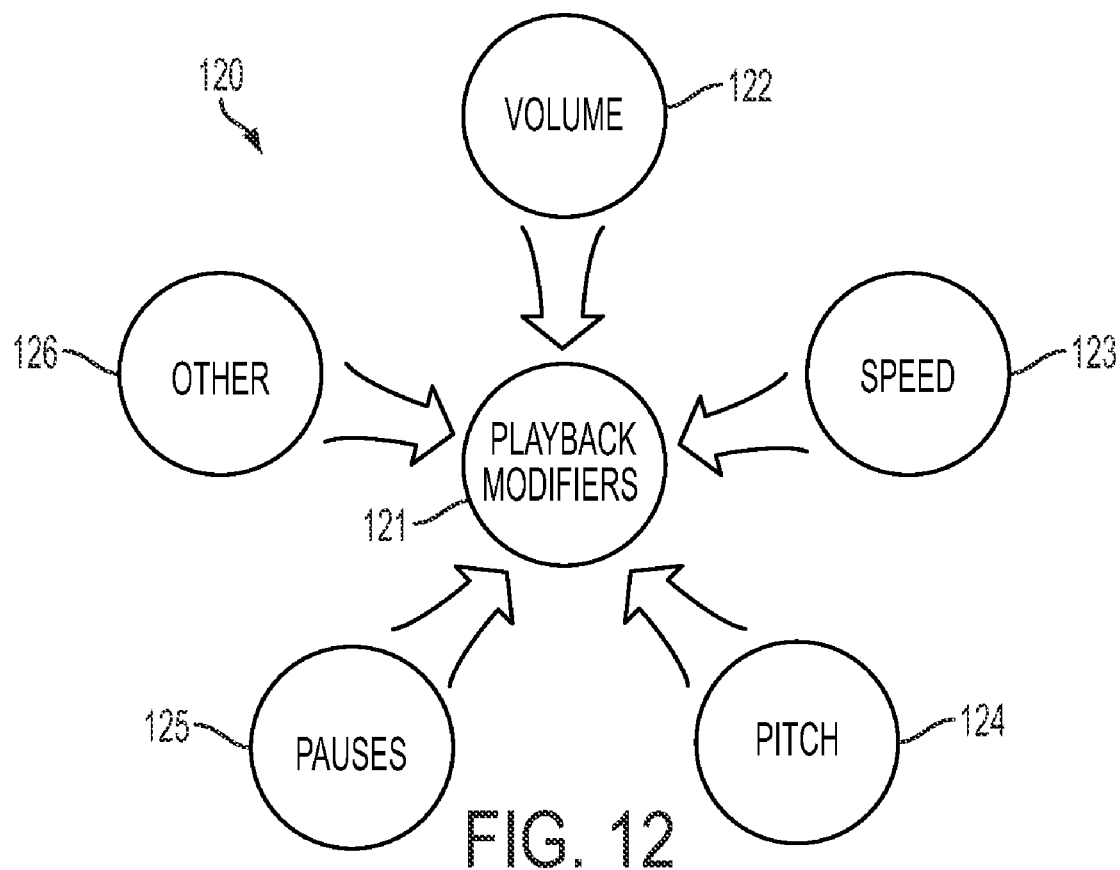
FIG. 12 is a data flow diagram showing, by way of example, types of playback modifiers of segments of interest.

Playback of injected segments of interest can be modified to differentiate the segments from the main conversation. FIG. 12 is a data flow diagram, showing, by way of example, types 120 of playback modifiers 121 of segments of interest. Playback modifiers 121 can include volume 122, speed 123, pitch 124, and pauses 125. Playback modifiers 121 may be automated or participant selected. Volume 122 modifies the playback volume of the segment. Speed 123 is the pace at which the segment is played. Playback at a faster speed can allow injection of a segment into a gap that the segment would have not been able to fit into when played at normal speed. Playback of the segment can be set at slower speed to enhance participant comprehension of the segment. Pitch 124 is the highness or lowness of the sound of the segment. Pauses 125 modifies the length of, or removes completely, pauses between words in the injected segment. Removing the pauses between words can allow longer segments to fit into smaller gaps. Other 126 playback modifiers 121 are possible.

System

Figure 13:
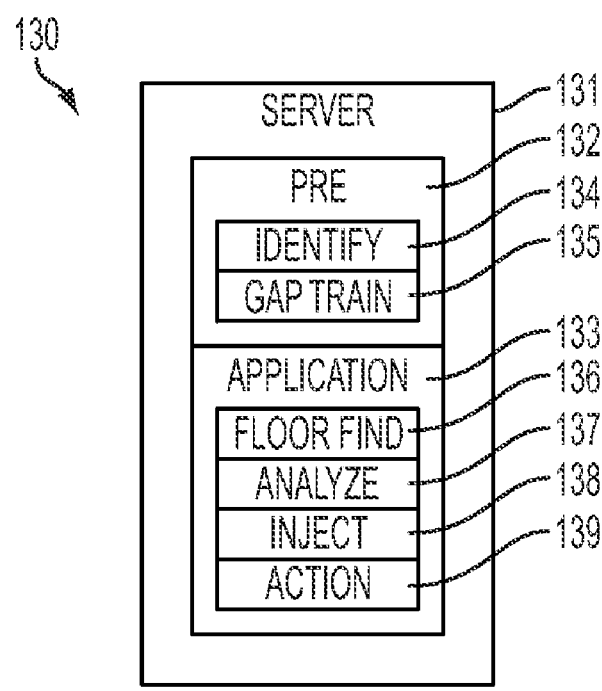
FIG. 13 is a block diagram showing a system for facilitating cognitive processing of simultaneous remote voice conversations.

Multiple simultaneous conversations within a remote conversation are monitored and processed by a system to mimic the human selective attention capability. FIG. 13 is a block diagram showing a system for facilitating cognitive processing of simultaneous remote voice conversations 130, in accordance with one embodiment. A centralized server 131 generally performs the monitoring and processing, but other systems or platforms are possible.

In one embodiment, the server 131 includes pre-application module 132 and application module 133. The pre-application module 132 includes submodules to identify 134 and gap train 135. The application module 133 contains submodules to find floors 136, analyze 137, inject 138, and take action 139, as appropriate. The server 131 is coupled to a database (not shown) or other form of structured data store, within which segments of interest (not shown) are maintained. Other modules and submodules are possible.

The identify submodule 134 identifies conversation segments that are of likely interest to a participant 11a-e. The segments can include "high meaning" words and phrases, as further discussed above with reference to FIG. 7. Other identification functions are possible. The gap train submodule 135 predicts gaps and length of gaps in the conversation flow of a participant's 11a-e main conversation. The gaps and gap lengths can be predicted based on training data, as further discussed above with reference to FIG. 8. Other gap training functions are possible.

The floor find submodule 136 identifies conversation floors from audio streams. The particular conversation floor, or main conversation, is identified as well. The conversation floors and main conversation can be identified directly by the action of the participant 11a-e or indirectly, such as described in commonly-assigned U.S. Pat. No. 7,698,141, issued Apr. 13, 2010, the disclosure of which is incorporated by reference, as further discussed above with reference to FIG. 9. The conversation floors that are not part of the main conversation, also referred to as parallel conversations or subconversations, for the participant at muted. Other conversation floor finding functions are possible.

The analyze submodule 137 parses the parallel conversations into conversation excerpts and analyzes the parallel conversations for excerpts that match the segments previously identified by the identify module 134. The analysis can be carried out by common information retrieval techniques, for example term frequency-inverse document frequency (TF-IDF). Other analysis functions are possible.

The inject submodule 138 injects segments of possible participant interest into a predicted gap of sufficient expected length in the main conversation. Other injection functions are possible. The action submodule 139 chooses an action to be taken on the injected segment. For example, the participant 11a-e can choose join the parallel conversation from which the injected segment was extracted, as further discussed above with reference to FIG. 11. Other action functions are possible.

While the invention has been particularly shown and described as referenced to the embodiments thereof, those skilled in the art will understand that the foregoing and other changes in form and detail may be made therein without departing from the spirit and scope of the invention.

What is claimed is:

1. A system for facilitating cognitive processing of simultaneous remote voice conversations, comprising:
   a communication module configured to receive a plurality of remote voice conversations between distributed participants provided over a shared communications channel;
   a floor module to identify from within the remote voice conversations each of a main conversation between at least two of the distributed participants and one or more subconversations between at least two other of the distributed participants;
   an identification module to define segments of interest to one of the distributed participants comprising a conversation excerpt having a lower attention activation threshold for the one distributed participant;
   an analysis module to parse each of the subconversations into live conversation excerpts and to compare the live conversation excerpts to the segments of interest;
   a gap prediction module to continually monitor the main conversation and to predict one or more gaps between conversation flow in the main conversation; and
   an injection module to selectively inject the live conversation excerpts into the gaps of the main conversation as provided to the one distributed participant over the shared communications channel.

2. A system according to claim 1, wherein the one distributed participant is at least one of actively involved in the main conversation and passively listening to the main conversation.

3. A system according to claim 1, further comprising:
a sound module to mute the subconversations as provided to the one distributed participant over the shared communications channel.

4. A system according to claim 1, wherein the segments of interest are selected from the group comprising parts of words, words, sentence fragments, sentences, and sounds.

5. A system according to claim 1, further comprising:
a playback modifier module to apply a playback modifier to the live conversation excerpts; and
a playback presentation module to modify presentation of the live conversation excerpts based on the playback modifier.

6. A system according to claim 5, wherein the playback modifier is selected from the group comprising volume, speed, pitch, and pause length.

7. A system according to claim 1, further comprising one or more of:
a selection module to select at least one of the segments of interest, and an action module to place the subconversation from which the one segment of interest was comprised as the main conversation; and
a storage module to store the subconversations corresponding to the live conversation excerpts, and a replay module to replay the subconversations upon termination of the main conversation.

8. A method for facilitating cognitive processing of simultaneous remote voice conversations, comprising:
participating in a plurality of remote voice conversations between distributed participants provided over a shared communications channel;
identifying from within the remote voice conversations each of a main conversation between at least two of the distributed participants and one or more subconversations between at least two other of the distributed participants;
defining segments of interest to one of the distributed participants comprising a conversation excerpt having a lower attention activation threshold for the one distributed participant;
parsing each of the subconversations into live conversation excerpts and comparing the live conversation excerpts to the segments of interest;
continually monitoring the main conversation and predicting one or more gaps between conversation flow in the main conversation; and
selectively injecting the live conversation excerpts into the gaps of the main conversation as provided to the one distributed participant over the shared communications channel.

9. A method according to claim 8, wherein the one distributed participant is at least one of actively involved in the main conversation and passively listening to the main conversation.

10. A method according to claim 8, further comprising:
muting the subconversations as provided to the one distributed participant over the shared communications channel.

11. A method according to claim 8, wherein the segments of interest are selected from the group comprising parts of words, words, sentence fragments, sentences, and sounds.

12. A method according to claim 8, further comprising:
applying a playback modifier to the live conversation excerpts; and
modifying presentation of the live conversation excerpts based on the playback modifier.

13. A method according to claim 12, wherein the playback modifier is selected from the group comprising volume, speed, pitch, and pause length.

14. A method according to claim 8, further comprising one or more of:
selecting at least one of the segments of interest, and placing the subconversation from which the one segment of interest was comprised as the main conversation; and
storing the subconversations corresponding to the live conversation excerpts, and replaying the subconversations upon termination of the main conversation.

15. A system for providing conversation excerpts to a participant from simultaneous remote voice conversations, comprising:
a communication module configured to receive a plurality of remote voice conversations between distributed participants provided over a shared communications channel;
a floor module to identify from within the remote voice conversations each of a main conversation in which one of the distributed participants is actively involved and one or more subconversations between at least two other of the distributed participants;
an identification module to define segments of interest to the one of the distributed participants comprising a conversation excerpt having a lower attention activation threshold for the one distributed participant;
a sound module to mute the subconversations as provided to the one distributed participant over the shared communications channel;
an analysis module to parse each of the subconversations into live conversation excerpts and to compare the live conversation excerpts to the segments of interest;
a gap prediction module to continually monitor the main conversation and to predict one or more gaps between conversation flow in the main conversation; and
an injection module to selectively inject the live conversation excerpts into the gaps of the main conversation as provided to the one distributed participant over the shared communications channel.

16. A system according to claim 15, wherein the identification module further comprises:
a criteria module to define a selection criteria for the one distributed participant; and
a segment selection module to identify segments of interest based on the selection criteria.

17. A system according to claim 16, wherein the selection criteria is selected from the group comprising personal details, interests, projects, terms, and term frequency.

18. A system according to claim 15, further comprising one or more of:
a selection module to select at least one of the segments of interest, and an action module to place the subconversation from which the one segment of interest was comprised as the main conversation; and
a storage module to store the subconversations corresponding to the live conversation excerpts, and a replay module to replay the subconversations upon termination of the main conversation.

19. A system according to claim 15, wherein the segments of interest are selected from the group comprising parts of words, words, sentence fragments, sentences, and sounds.

20. A method for providing conversation excerpts to a participant from simultaneous remote voice conversations, comprising:
- actively participating in a plurality of remote voice conversations between distributed participants provided over a shared communications channel;
- identifying from within the remote voice conversations each of a main conversation in which one of the distributed participants is actively involved and one or more subconversations between at least two other of the distributed participants;
- defining segments of interest to the one of the distributed participants comprising a conversation excerpt having a lower attention activation threshold for the one distributed participant;
- muting the subconversations as provided to the one distributed participant over the shared communications channel;
- parsing each of the subconversations into live conversation excerpts and comparing the live conversation excerpts to the segments of interest;
- continually monitoring the main conversation and predicting one or more gaps between conversation flow in the main conversation; and
- selectively injecting the live conversation excerpts into the gaps of the main conversation as provided to the one distributed participant over the shared communications channel.

21. A method according to claim 20, further comprising:
- defining a selection criteria for the one distributed participant; and
- identifying segments of interest based on the selection criteria.

22. A method according to claim 21, wherein the selection criteria is selected from the group comprising personal details, interests, projects, terms, and term frequency.

23. A method according to claim 20, further comprising one or more of:
- selecting at least one of the segments of interest, and placing the subconversation from which the one segment of interest was comprised as the main conversation; and
- storing the subconversations corresponding to the live conversation excerpts, and replaying the subconversations upon termination of the main conversation.

24. A method according to claim 20, wherein the segments of interest are selected from the group comprising parts of words, words, sentence fragments, sentences, and sounds.

* * * * *